United States Patent [19]

Koyama et al.

[11] Patent Number: 4,853,917

[45] Date of Patent: Aug. 1, 1989

[54] OPTICAL INFORMATION PROCESSING APPARATUS PROVIDED WITH A PHOTODETECTOR DISPOSED OUTSIDE PART OF THE EFFECTIVE DIAMETER OF A LENS SYSTEM AND ADAPTED TO BE MOVABLE WITH THE LENS SYSTEM TO THEREBY DETECT THE POSITION OF THE LENS SYSTEM

[75] Inventors: Osamu Koyama, Kawasaki; Kazuo Uzuki; Makoto Shiho, both of Yokohama; Shigeru Aoi, Kawasaki, all of Japan

[73] Assignee: Canon Kabushiki Kaisha, Tokyo, Japan

[21] Appl. No.: 41,348

[22] Filed: Apr. 22, 1987

[30] Foreign Application Priority Data

Apr. 25, 1986 [JP] Japan .................................. 61-96175
Apr. 28, 1986 [JP] Japan .................................. 61-96864
Jun. 16, 1986 [JP] Japan .................................. 61-138344

[51] Int. Cl.$^4$ ................................................. G11B 7/00
[52] U.S. Cl. ............................................ 369/44; 369/46
[58] Field of Search ................................... 369/43–47, 369/112; 250/201; 358/342

[56] References Cited

U.S. PATENT DOCUMENTS 4,507,766 3/1985 Saimi et al. ........................ 369/46 X Primary Examiner—Robert L. Richardson
Attorney, Agent, or Firm—Fitzpatrick, Cella Harper & Scinto

[57] ABSTRACT

An optical information processing apparatus including a light source, a lens system for condensing the light beam emitted from the light source as a minute spot on the track of a recording medium, tracking signal detectors for receiving the light beam from the spot modulated by the recording medium to thereby detect the positional deviation of the spot relative to the track in the tracking direction crossing the track, a correcting device for moving the lens system in the tracking direction in response to the output signal from the tracking signal detectors to thereby correct the positional deviation, and lens position detectors including at least one photoelectric converting element provided outside the effective diameter of the lens system so as to be movable with the lens system, and directly receiving part of the light beam emitted from the light source by the photoelectric converting element to thereby detect the position of the lens system in the tracking direction.

9 Claims, 12 Drawing Sheets

OPTICAL TRACKING APPARATUS WITH PHOTODETECTOR DISPOSED OUTSIDE PART OF THE EFFECTIVE DIAMETER OF THE LENS SYSTEM

BACKGROUND OF THE INVENTION

1. Field of the Invention

This invention relates to an optical information processing apparatus such as an optical disk apparatus for causing the light beam from a light source to be condensed as a minute spot on a predetermined track on a recording medium and effecting recording or reproduction of information, and in particular to an apparatus provided with tracking means for correcting the positional deviation between the spot and the predetermined track.

2. Related Background Art

Generally in an optical disk apparatus of the DRAW (direct read after write) type or of the rewritable type, spiral guide grooves for tracking are preformed on the disk. The pitch of the guide grooves is as small as 1 μm and therefore, when a light spot is applied to the guide grooves, a diffraction occurs and the diffracted light is scattered in a direction perpendicular to the tracks. In the tracking method called the push-pull method, the variation in the light and shade of the pattern of the 0-order and ±1st-order diffracted lights on a detector for tracking is taken out as a tracking error signal, whereby tracking servo is effected.

In an optical disk apparatus wherein an objective for condensing a minute spot on a predetermined track is moved relative to a detector for tracking to thereby effect tracking servo if there is great eccentricity of the disk, the center of the spot on the detector is displaced to cause offset of the tracking error signal and thus, it has been difficult to accomplish accurate tracking.

This will be described in detail with reference to FIGS. 1A to 6 of the accompanying drawings.

FIGS. 1A, 1B, 2A and 2B schematically show the construction of an optical information processing apparatus according to the prior art. In these figures, reference numeral 1 designates a semiconductor laser, reference numeral 2 denotes a collimator lens, reference numeral 3 designates a half-mirror, reference numeral 7 denotes a disk, reference numeral 8 designates an actuator, reference numeral 9 denotes a condensing lens, and reference characters 10a and 10b designate the light-receiving surfaces of two-division detectors for tracking. In these figures, only optical systems necessary to explain the tracking method are shown and it is to be understood that detection of information carried on the disk and focus detection are accomplished in conventional manner.

In FIG. 1A, a light beam emitted from the semiconductor laser 1 is collimated by the collimator lens 2 and condensed on a predetermined track of the disk 7 having tracking guide grooves by the objective 6. Reference numeral 8 designates an actuator for moving the objective 6 in a direction perpendicular to the track as indicated by arrow T and crossing the optic axis of the incident light and correcting the positional deviation between the spot imaged by the objective and the track. When the eccentricity of the disk 7 is very small, the optic axis of the objective and the center of the light beam from the laser are substantially coincident with each other, and a diffracted light beam including the asymmetry of the ±1st-order diffracted lights corresponding to the positional deviation between the track and the spot again enters the objective 6. The light beam again collimated by the objective 6 is reflected by the half-mirror 3 and condensed on the light-receiving surfaces 10a and 10b of the detector by the condensing lens 9. The light receiving surfaces 10a and 10b are usually provided at a distance D from the Gaussian image surface of the condensing lens 9. The spot on the detector lies on the axis X—X' as shown in FIG. 1B, and a tracking error signal is produced by the asymmetry (not shown) of the ±1st-order diffracted lights on the light-receiving surfaces 10a and 10b.

A case where the eccentricity of the disk 7 is relatively great will now be described with reference to FIG. 2A. Assuming that the eccentricity is as great as δ, the actuator 8 causes the objective 6 to follow it. Therefore, the light beam from the semiconductor laser 1 enters the objective with the center thereof deviating by δ from the center of the objective, so that if the focal length of the condensing lens is $f_2$, the deviation Δ of the center of the spot on the detector shown in FIG. 2B is given by the following equation:

$$\Delta = 2\delta \cdot \frac{D}{f_2} \quad (1)$$

For example, if δ=100 μm and D=2 mm and $f_2$=40 mm, Δ=10 μm, and this is not a small amount as compared with the diameter 250 μm of the spot on the detector (when the focal length $f_1$ of the objective is $f_1$=5 mm and the N.A. of the objective is N.A.=0.5)

In such as apparatus, a case where a tracking error signal 19 is obtained by the use of a circuit as shown in FIG. 3 of the accompanying drawings will now be considered. In FIG. 3, reference numerals 15 and 16 designate amplifiers for amplifying the outputs from the light-receiving surfaces 10a and 10b, respectively, and reference numeral 17 denotes a differential amplifier. When the eccentricity of the disk 7 is very small, the center of the objective and the center of the light beam from the laser are substantially coincident with each other as previously described and therefore, when servo has been effected so as to render the tracking error signal 19 zero, ±1st-order diffracted lights 20 and 21 are diffracted symmetrically with respect to the track as shown in FIG. 4A of the accompanying drawings, and the spot accurately follows a predetermined track. The light amount distribution on the detector is such as shown in FIG. 4B of the accompanying drawings. Reference numerals 22 and 24 designate areas in which ±1st-order diffracted lights overlap 0-order diffracted light 23.

When the eccentricity of the disk 7 is relatively great, the center of the spot deviates by Δ from the optic axis on the detector as shown in FIG. 5B of the accompanying drawings and therefore, when servo has been effected so as to render the tracking error signal 19 into, ±1st-order diffracted lights 25 and 26 are diffracted asymmetrically with respect to the track as shown in FIG. 5A of the accompanying drawings, and the spot causes track deviation of d from the center of a predetermined track. In such a case, crosstalk with the adjacent tracks increases to aggravate the error rate.

To overcome such a disadvantage, an apparatus of the construction as shown, for example, in FIG. 6 of the accompanying drawings is proposed. That is, a beam splitter 30 is inserted between a half-mirror 3 for separating the optical paths of the light beam from a light source and a light beam travelling toward reproduction signal detecting means and an objective 6 to direct part of the reflected light beam from a disk to the light-receiving surfaces 10a and 10b of a detector for tracking. All these are carried by the same housing 31 and therefore, the spot on the detector does not move even if tracking is effected. Such an apparatus, however, suffers from the following disadvantages:

(1) The construction is complicated and this is disadvantageous with respect to cost.

(2) The weight of the movable portion is increased and an actuator 8 is bulky.

(3) The presence of the beam splitter 30 reduces the utilization efficiency of the light amount.

On the other hand, in order to correct the offset of the tracking error signal as previously described, U.S. Pat. No. 4,302,830 proposes an optical information processing apparatus provided with means for detecting the position of the objective. This apparatus is designed such that a piezo-electric element is attached to a resilient member for movably supporting the objective and with movement of the objective, the piezo-electric element is deformed with the resilient member to thereby produce an electrical signal, from which the position of the objective is detected.

However, in the apparatus described in the aforementioned U.S. Pat. No. 4,302,830 the piezo-electric element must be deformed simultaneously with the movement of the objective and therefore, the force of restitution of this piezo-electric element provides a load and thus, it has been impossible to move the objective by a small drive force. Also, it has been conceived that if the apparatus is used for a long period of time, repeated deformation of the piezo-electric element fatigues and destroys it.

SUMMARY OF THE INVENTION

It is an object of the present invention to overcome the above-noted disadvantages peculiar to the prior art and to provide an optical information processing apparatus, which is simple in construction and which can accomplish tracking accurately even when use is made of a recording medium such as a disk of great eccentricity which requires great tracking control.

It is another object of the present invention to provide an optical information processing apparatus in which an objective can be fixed at a predetermined position as required. Thus, it becomes possible to ensure that the objective will be returned accurately to the predetermined position even if an actuator has some degree of hysteresis. Also, even under great acceleration occurring during access, the objective can be held at the predetermined position, and this contributes to quick access.

The above objects of the present invention are achieved by an optical information processing apparatus comprising a light source, a lens system for condensing the light beam from the light source as a minute spot on the track of a recording medium, tracking signal detecting means for receiving the light beam from the spot modulated by the recording medium to thereby detect the positional deviation of the spot relative to the track in the tracking direction crossing the track, correcting means for moving the lens system in the tracking direction in response to the output signal from the tracking signal detecting means to thereby correct the positional deviation, and lens position detecting means including at least one photoelectric converting element provided outside the effective diameter of the lens system so as to be movable with the lens system, and directly receiving part of the light beam from the light source by the photoelectric converting element to thereby detect the position of the lens system in the tracking direction. That is, in the present invention, part of a light beam applied from the light source to a medium is utilized, whereby the non-contact lens position is detected by a simple construction in which the photoelectric converting element is only provided outside the effective diameter of the objective.

Thus, according to the present invention, there can be realized an optical information processing apparatus in which the objective can be moved by a small drive force and which can stand long use.

DESCRIPTION OF THE PREFERRED EMBODIMENTS

The embodiments of the present invention will hereinafter be described in detail with reference to the drawings.

Figure 1A:
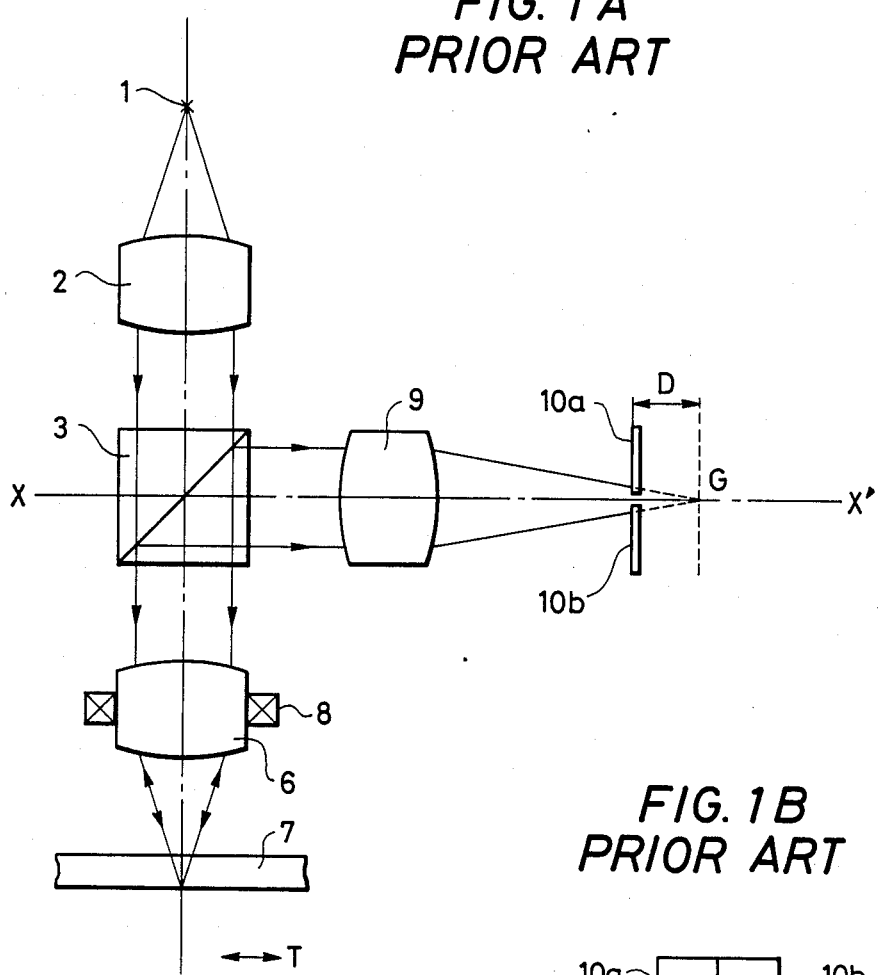
FIGS. 1A, 1B, 2A and 2B schematically show the construction of an optical information processing apparatus according to the prior art.
Figure 1B:
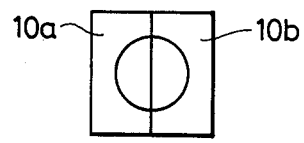
Figure 2A:
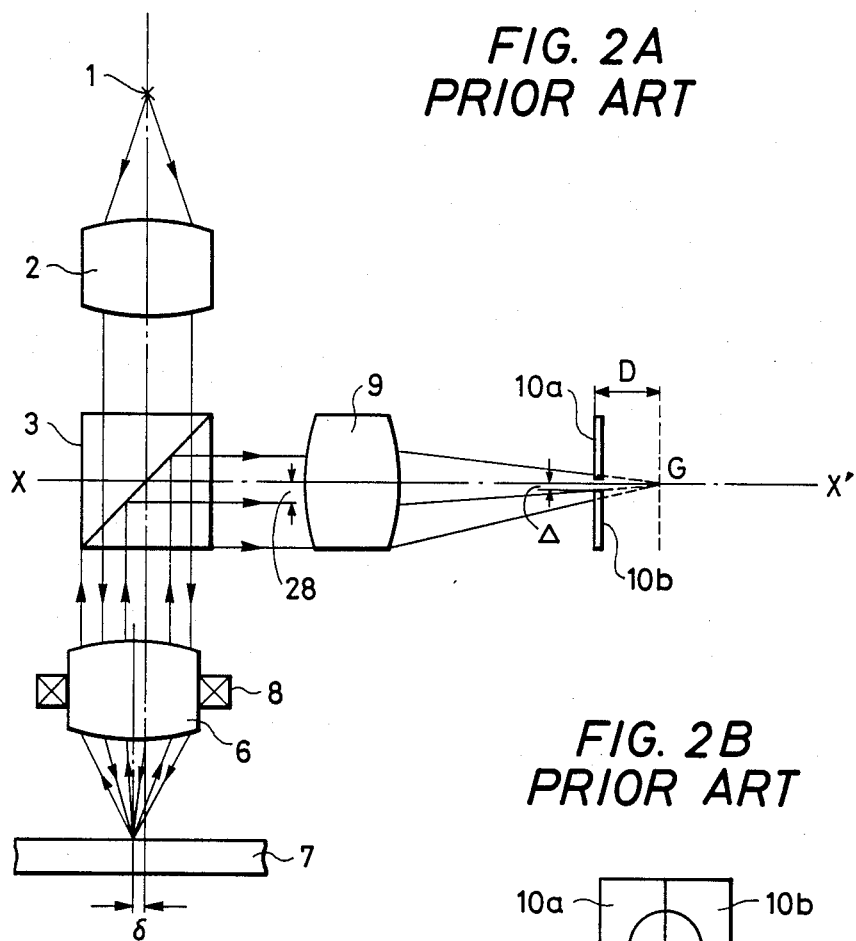
Figure 2B:
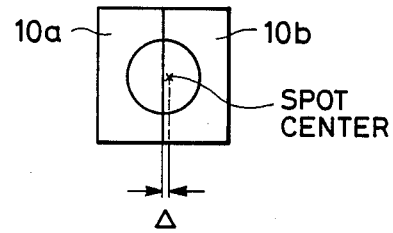
Figure 3:
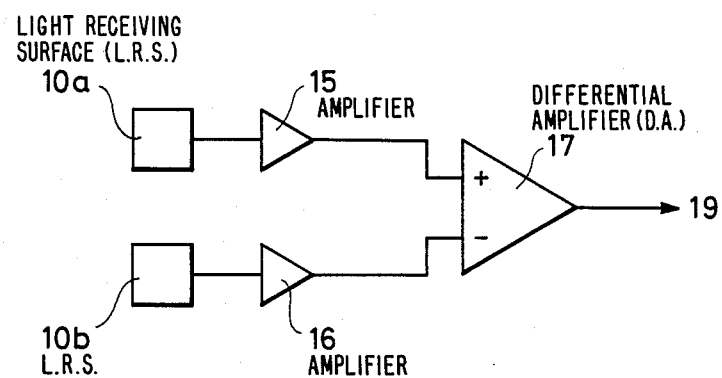
FIG. 3 is a block diagram showing an example of the construction of a tracking error signal detecting circuit in the prior art apparatus.
Figure 4A:
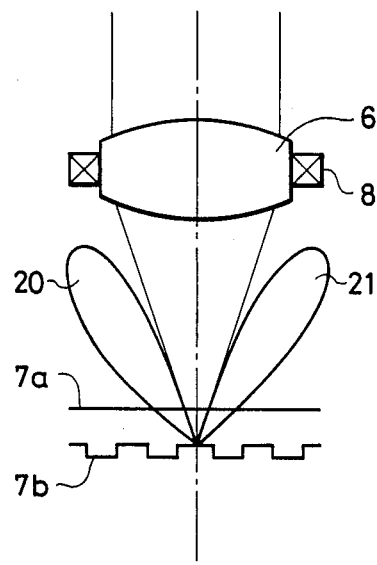
FIGS. 4A, 4B, 5A and 5B schematically show the manner of tracking control in the prior art apparatus.
Figure 4B:
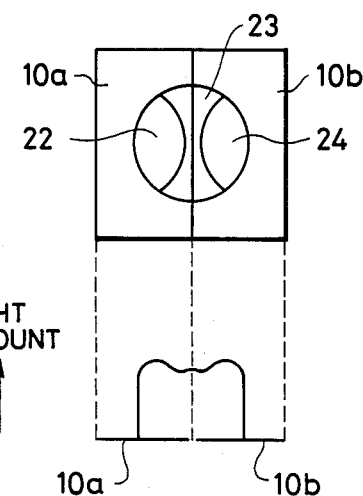
Figure 5A:
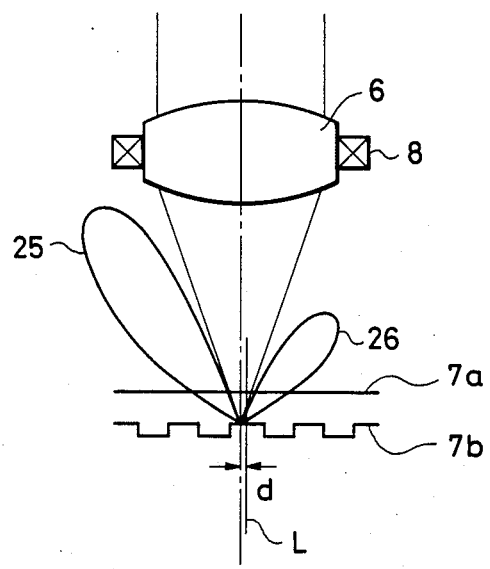
Figure 5B:
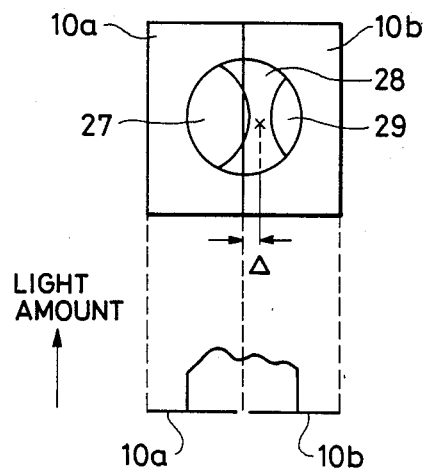
Figure 6:
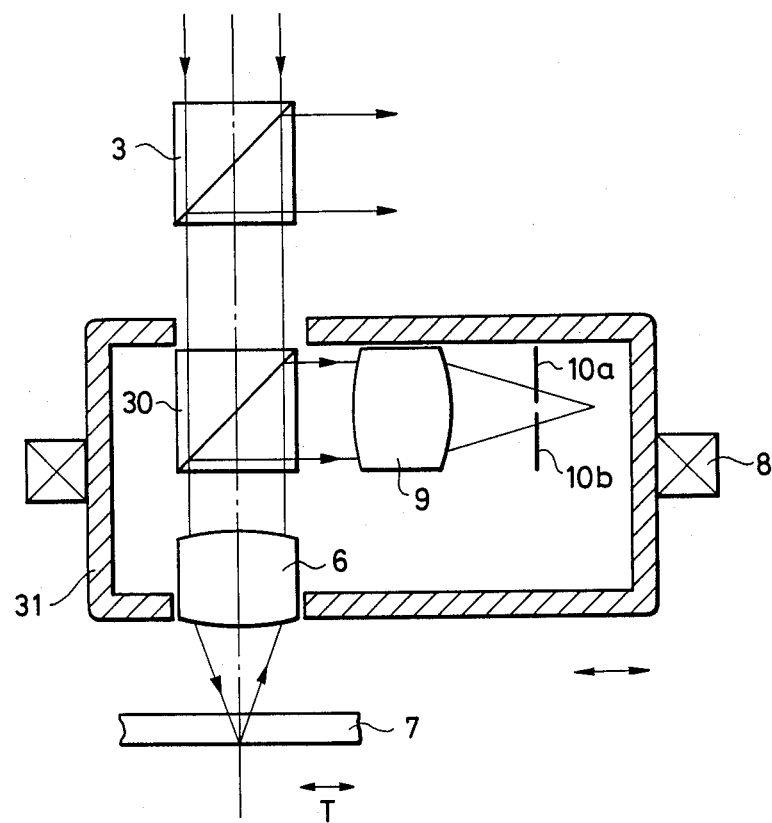
FIG. 6 schematically shows another example of the optical information processing apparatus according to the prior art.
Figures 7A, 7B:
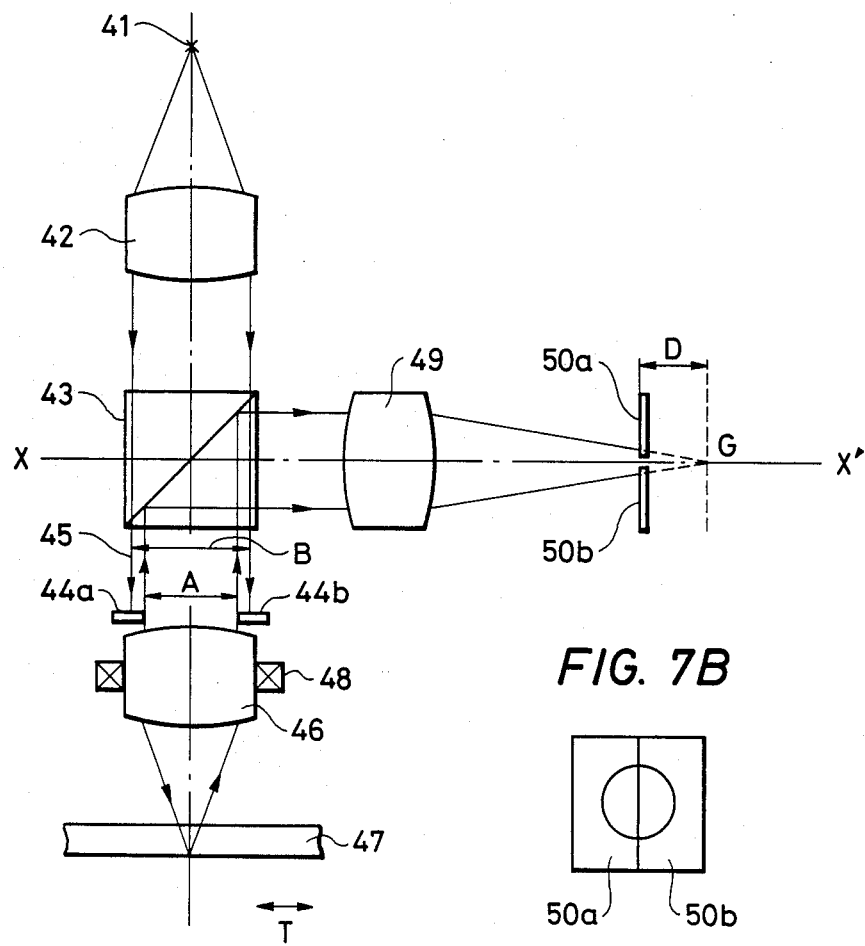
FIG. 7A is a schematic cross-sectional view showing an embodiment of the optical information processing apparatus of the present invention.
FIG. 7B is a plan view showing the light-receiving surfaces of a detector shown in FIG. 7A.
Figure 8:
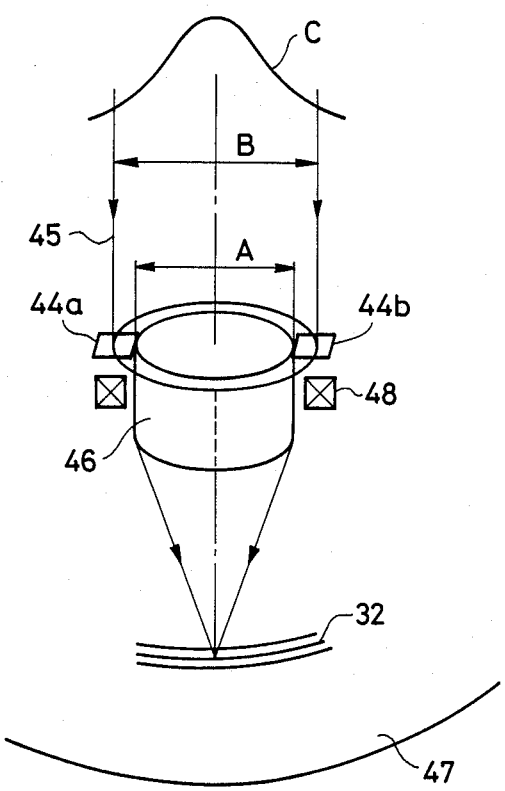
FIG. 8 is a perspective view showing the vicinity of the objective of the apparatus shown in FIG. 7A.

FIGS. 7A to 8 show the construction of a first embodiment of the present invention, FIG. 7A being a schematic cross-sectional view of the apparatus, FIG. 7B being a plan view showing the light-receiving surface of a detector, and FIG. 8 being a perspective view of the vicinity of an objective.

The present embodiment differs from the prior art apparatus in that outside the effective diameter of an objective 46, there are provided photoelectric converting elements 44a and 44b movable with the objective 46 and directly receiving part of the light beam from a semiconductor laser 41. In the present embodiment, only optical systems necessary to explain the tracking function are shown and it is to be understood that detection of information carried on a disk and detection of defocus are accomplished by conventional methods.

The light beam emitted from the semiconductor laser 41 is collimated by a collimator lens 42 and passes through a half-mirror 43, whereafter it enters the objective 46 with a diameter B greater than the effective diameter A of the objective 46. This is for preventing the objective 46 from protruding within the light beam 45 even if during tracking, the objective 46 is moved in the tracking direction indicated by arrow T by an actuator 48. The photoelectric converting elements 44a and 44b are disposed symmetrically on a straight line lying in the marginal portion of the light beam 45 and passing through the center of the objective 46 and perpendicular to the track, and are adjusted so that their outputs are equal to each other when the center of the light beam from the light source coincides with the center of the objective. The light beam 45 generally has a Gaussian distribution C symmetrical with respect to the optic axis, and if the center of the objective deviates from the optic axis, a signal corresponding to the deviation may be obtained by taking the differential output of the photoelectric converting elements 44a and 44b. The light beam condensed as a minute spot on a predetermined track of the disk 47 having tracking guide grooves, by the objective 46, is modulated by recording information and is also diffracted including the information of track deviation and focus deviation. The light beam again collimated by the objective 46 is condensed on the light receiving surfaces 50a and 50b of a detector by a condensing lens 49. The light receiving surfaces 50a and 50b are disposed symmetrically with respect to the optic axis X—X' as shown in FIG. 7B.

Figure 9:
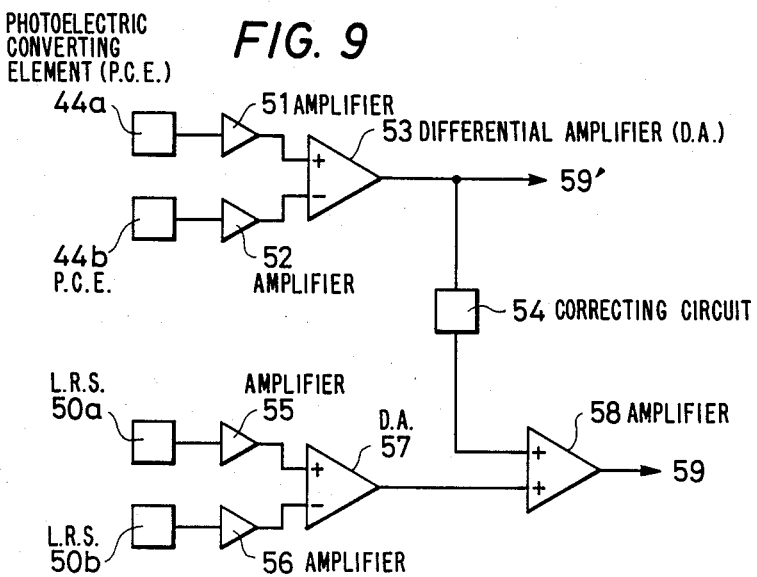
FIG. 9 is a block diagram showing an example of the construction of a signal processing circuit in the apparatus shown in FIG. 7A.

FIG. 9 is a block diagram showing an example of the construction of a signal processing circuit for obtaining a tracking error signal in the embodiment shown in FIG. 7A. In FIG. 9, reference numerals 51 and 52 designate amplifiers for amplifying the outputs from the photoelectric converting elements 44a and 44b, reference numeral 53 denotes a differential amplifier, reference numeral 54 designates a correcting circuit, reference numerals 55 and 56 denote amplifiers for amplifying the outputs from the light-receiving surfaces 50a and 50b of a detector for tracking, reference numeral 57 designates a differential amplifier, and reference numeral 58 denotes an amplifier for adding the outputs from the correcting circuit 54 and the differential amplifier 57.

When the eccentricity of the disk 47 is very small, the center of the objective and the center of the light beam from the laser are substantially coincident with each other and therefore, the differential output of the photoelectric converting elements 44a and 44b is zero, and if tracking servo is effected so that the differential output of the light-receiving surfaces 50a and 50b is zero, the spot will accurately follow a predetermined track. Also, when the eccentricity of the disk 47 is relatively great, the center of the objective and the center of the light beam from the laser deviate from each other by an amount δ corresponding to the eccentricity and therefore, a tracking error signal having the deviation Δ of the center of the spot on the detector superposed on the differential output from the light-receiving surfaces 50a and 50b is output. On the other hand, different outputs corresponding to the deviation of the center of the objective are provided from the photoelectric converting elements 44a and 44b and therefore, the position of the objective can be known from the differential output thereof. This differential output is made by the correcting circuit 54 into an output which will correct the amount of superposition of the deviation of the center of the spot on the tracking error signal output from the differential amplifier 57. From the outputs from the correcting circuit 54 and the differential amplifier 57, there can be obtained via the addition amplifier 58 a tracking error signal 59 in which the amount of superposition of the deviation of the center of the spot by eccentricity has been corrected. If tracking servo is effected so that the signal 59 is zero, the spot can accurately follow a predetermined track.

Further aspects of the present embodiment will now be described. Generally, the actuator 48 is a vibratory system and when no extraneous force is applied thereto, it is difficult to hold the actuator at a predetermined location. In some cases, the actuator 48 has hysteresis and it is difficult to return it to a predetermined position by the prior art apparatus. On the other hand, in the present embodiment, an objective position signal 59' can be obtained from the differential amplifier 53 in the circuit shown in FIG. 9. If the objective is moved so that the signal 59' is zero, the objective can always be returned to a predetermined position even if the actuator has some degree of hysteresis.

Figure 10A:
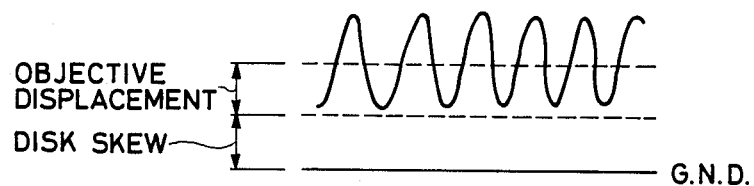
FIGS. 10A and 10B are signal wave form diagrams illustrating the manner of skew detection using the apparatus of FIG. 7A.
Figure 10B:
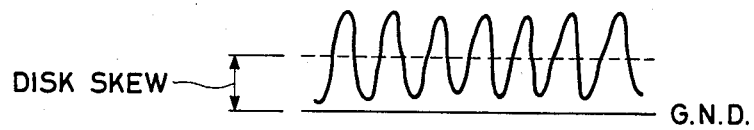

Also, when the disk has skew, the position of the spot shifts on the tracking detector as when the position of the objective deviates from the optic axis. In such case, the technique of peak-detecting the tracking error signal with a tracking servo circuit being opened is shown in FIG. 10B. Detecting the amount of skew of the disk and correcting it is known, but when the actuator has hysteresis, the shift of the spot resulting from the deviation of the position of the objective is superposed as shown in FIG. 10B and thus, accurate detection of the skew becomes difficult.

So, if the objective is held in a predetermined position by the embodiment of the present invention, accurate detection of the skew will become possible and further, accurate tracking will be possible.

Furthermore, when the optical head is accessed at a high speed, the actuator is subjected to a considerably great acceleration. Read-out of recorded information need by effected after vibration of the objective lens system has stopped, and a loss time occurs due ot the vibration resulting from the aforementioned acceleration. So, in the previously described embodiment, if during the access, the objective is held in a predetermined position, such a loss time can be eliminated. The present invention is effective not only when access is effected, but also when it is necessary to hold the objective in the predetermined position.

Figure 11:
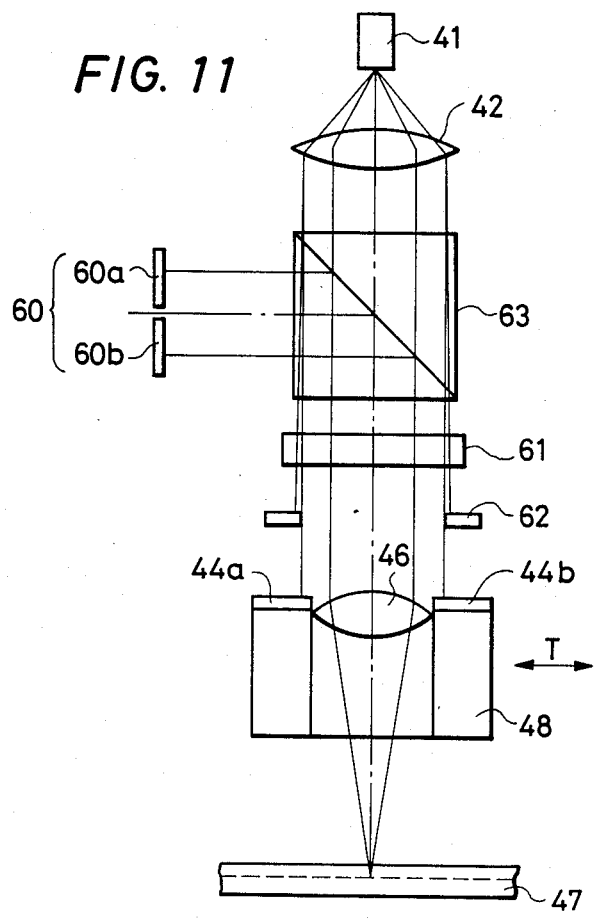
FIG. 11 is a schematic cross-sectional view showing another embodiment of the present invention.

FIG. 11 is a schematic cross-sectional view showing a second embodiment of the optical information processing apparatus of the present invention. In FIG. 11, like members to those in FIG. 7A are given like reference numerals and need not be described in detail. In the present embodiment, a stop 62 for limiting the light entering the photoelectric converting elements 44a and 44b is provided in the optical path between the photoelectric converting elements 44a, 44b and the light source. Therefore, the outline of the incident light on the light-receiving surfaces of the photoelectric converting elements 44a and 44b become clear and thus, there is provided the effect of the resolving power of the position detection being improved. The stop 62 may be replaced by a knife edge or the like having a clear-cut edge to obtain a similar effect.

Figures 12A, 12B, 12C:
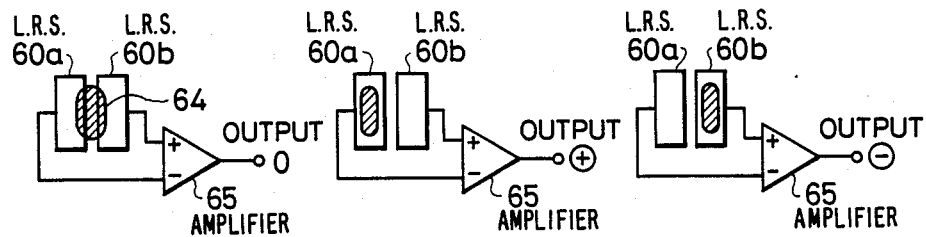
FIGS. 12A, 12B and 12C are schematic views illustrating the principle of tracking signal detection in the apparatus shown in FIG. 11.

In the present embodiment, a polarizing beam splitter 63 and a quarter wavelength plate 61 are used in place of the half-mirror and therefore, the reflected light from a medium 47 can be completely separated from the incident light from the light source and directed to a detector 60 and thus, utilization efficiency of the light is improved. The aforementioned reflected light is received directly by the light-receiving surfaces 60a and 60b of the detector 60 without the intermediary of a condensing lens or the like. A tracking error signal is detected in the manner shown in FIGS. 12A–12C. That is, when the spot is accurately applied to the track on the medium 47, the distribution of the reflected light on the light-receiving surfaces 60a and 60b is such as shown by 64 in FIG. 12A and the output of a differential amplifier 65 is zero. In contrast, when the spot positionally deviates with respect to the track, a positive or negative tracking error signal is output from the differential amplifier 65 as shown in FIG. 12B or 12C.

Figure 13:
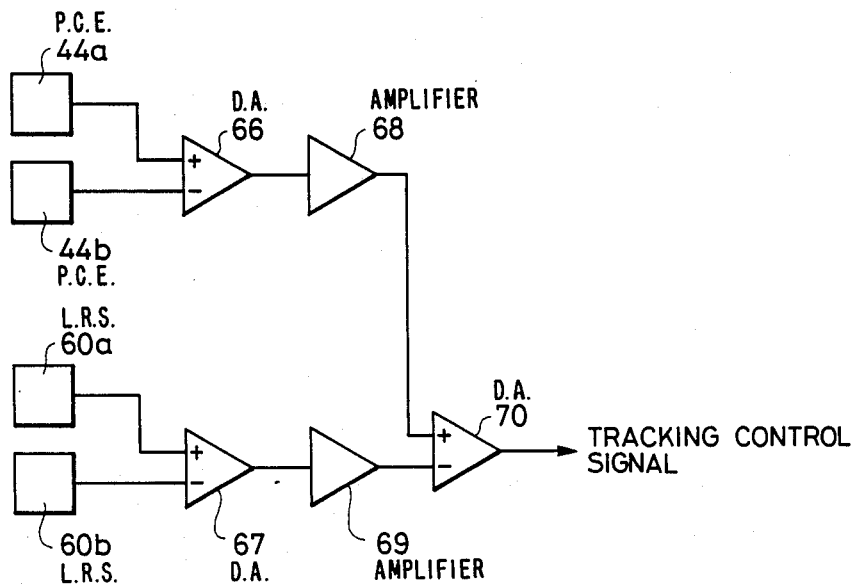
FIG. 13 is a block diagram showing an example of the construction of a signal processing circuit in the apparatus shown in FIG. 11.

Again in the present embodiment, correction of the offset of the tracking error signal is effected by the use of a circuit as shown in FIG. 13 in the same manner as in the first embodiment. In FIG. 13, reference numerals 66, 67 and 70 designate differential amplifiers, and reference numerals 68 and 69 denote amplifiers.

Figure 14:
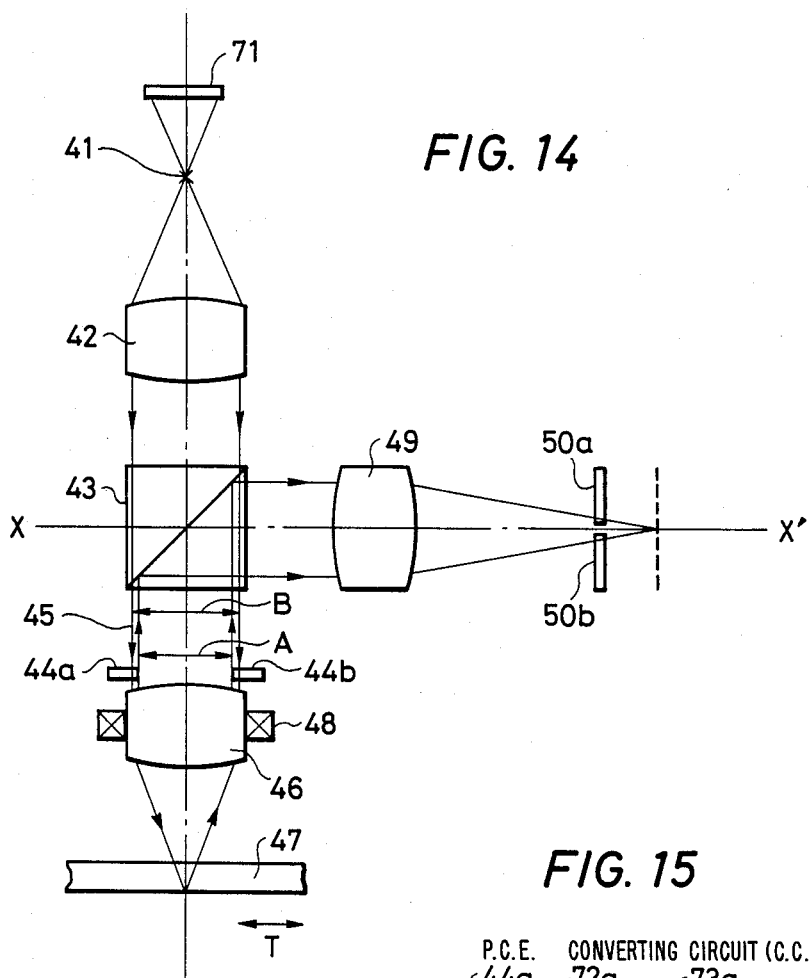
FIG. 14 is a schematic cross-sectional view showing still another embodiment of the present invention.

FIG. 14 is a schematic cross-sectional view showing a third embodiment of the optical information processing apparatus of the present invention. In FIG. 14, like members to those in FIG. 7A are given like reference numerals and need not be described in detail. The present embodiment differs from the first embodiment in that provision is made for a photodetector 71 for receiving light emitted from the end surface of the semiconductor laser 41 opposite to the surface thereof which emits a light to the medium 47 and detecting a light output.

Generally, in an optical information processing apparatus, the intensity of the output light of a semiconductor laser (a light source) is changed over depending on the recording, reproduction or erasing of information. Also, the intensity is fluctuated by a variation in the ambient temperature or the like. Where detection of the lens position is effected by the use of part of the light from the light source as in the present invention, if the variation in such intensity of light is great, it may adversely affect the detection signal and accurate detection may not be accomplished. The present embodiment is such that the variation in such intensity of light is detected by the photodetector 71 and the lens position detection signal is corrected.

Figure 15:
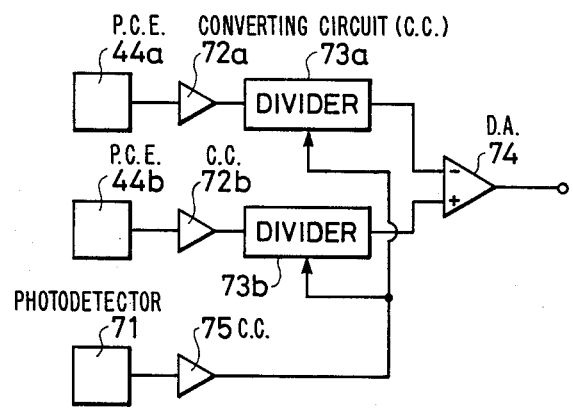
FIG. 15 is a block diagram showing an example of the construction of a signal processing circuit in the apparatus shown in FIG. 14.

FIG. 15 is a block diagram showing an example of the construction of a signal processing circuit used in the apparatus shown in FIG. 14. In FIG. 15, reference characters 72a and 72b designate circuits for converting the outputs of the photoelectric converting elements 44a and 44b into voltages, reference numeral 75 denotes a circuit for converting the output of the photodetector 71 into a voltage, reference characters 73a and 73b designate circuits for dividing the outputs of the circuits 72a and 72b by the output of the circuit 75, and reference numeral 74 denotes a differential amplifier which outputs the difference between the outputs of the divider circuits 73a and 73b.

Figure 16A:
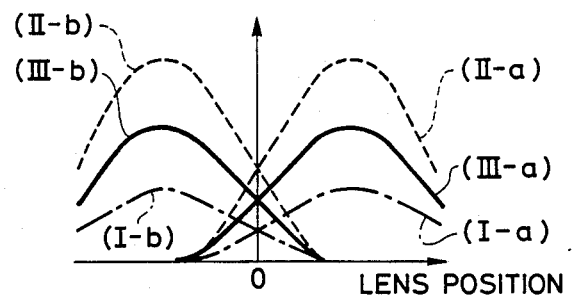
FIGS. 16A and 16B show variations in signal outputs corresponding to the lens positions in various portions of the circuit shown in FIG. 15.
Figure 16B:
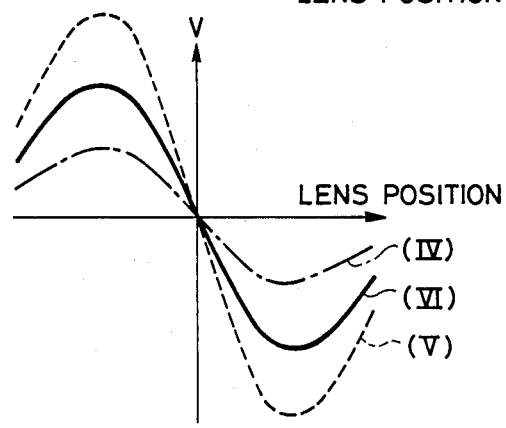

The outputs of the circuits 72a and 72b are shown in FIG. 16A. In FIG. 16A, the abscissa represents the lens position and the ordinate represents the output voltage, and the output of the circuit 72a varies as indicated by (I-a) and (II-a) as the intensity of light of the laser 41 is varied by recording, reproduction and erasing. Likewise, the output of the circuit 72b varies as indicated by (I-b) and (II-b). The magnitude of this variation in voltage is proportional to the variation in the intensity of light of the laser 41 and therefore, by detecting the output of the laser 41 by the photodetector 71, converting it into a voltage and dividing the outputs of the circuits 72a and 72b by this output, the outputs of the divider circuits 73a and 73b can be made constant as indicated by (III-a) and (III-b) even if the output of the laser 41 varies. From this difference, the output (VI) of FIG. 16B is derived, and even if the output of the laser 41 varies, the output corresponding to the lens position does not vary but is always constant as indicated by the outputs (IV) and (V) of FIG. 16B corresponding to (I-a), (I-b) and (II-a), (II-b) of FIG. 16A.

Figure 17:
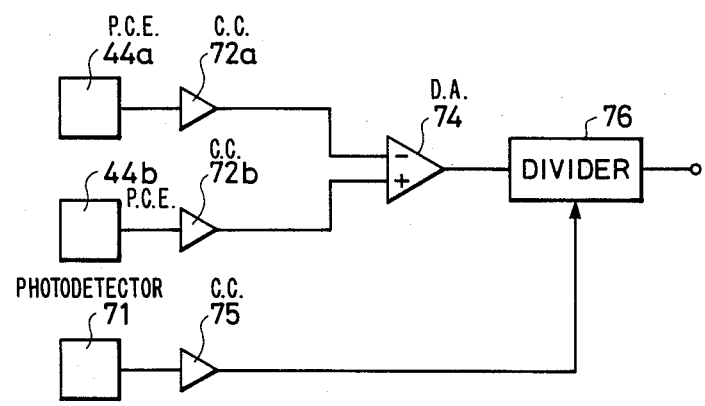
FIGS. 17 to 20 are block diagrams showing modifications of the signal processing circuit in the apparatus shown in FIG. 14.

FIG. 17 is a block diagram showing a modification of the signal processing circuit used in the present invention. In FIG. 17, like members to those in FIG. 15 are given like reference characters, and reference numeral 76 designates a divider for dividing the output of the differential amplifier 74 by the output of the circuit 75. Again in this case, the output of the divider 76 is constant irrespective of any variation in the output of the laser 41.

Figure 18:
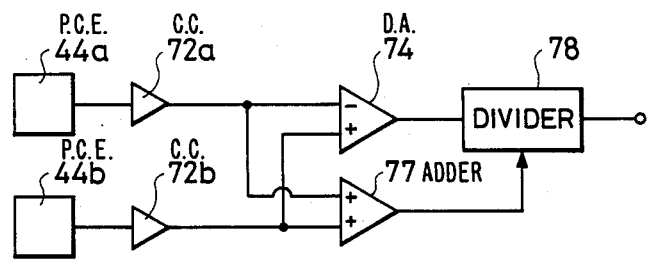

FIG. 18 is a block diagram showing another modification of the signal processing circuit used in the present invention. In the case of this embodiment, the photodetector 71 shown in FIG. 14 is unnecessary. In FIG. 18, the sum of the outputs of the circuits 72a and 72b is taken by an adder 77, whereby any variation in the output of the laser 41 is detected. By dividing the output of the differential amplifier 74 by this output, lens position detection which is not affected by any variation in the output of the laser 41 can be accomplished.

Figure 19:
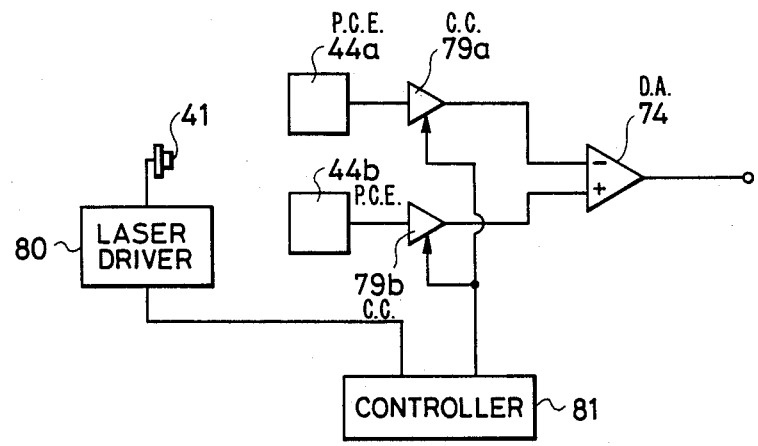

FIG. 19 is a block diagram showing still another modification of the signal processing circuit. In FIG. 19, reference numeral 80 designates a laser driver, and reference characters 79a and 79b denote converting circuits which convert the outputs of the photoelectric converting elements 44a and 44b, respectively, into voltages and whose amplification rates can be changed over in accordance with the instructions from a controller 81. In the case of this embodiment, instructions are given from the controller 81 to a laser driver 80 with the recording, reproduction and erasing so as to change over the output of the laser 41. Simultaneously therewith, instructions are given to the circuits 79a and 79b so as to change over (or vary) the amplification rate correspondingly to the variation in the outputs thereof. For example, where the laser output is 1 mW during reproduction and 5 mW during recording, switching is effected by an information signal and the average output during recording is 2.5 mW, and when change-over takes place from reproduction to recording, the average light amount becomes 2.5 times as great and therefore, the amplification rate of the circuits 79a and 79b is rendered into ⅒.5 times.

Figure 20:
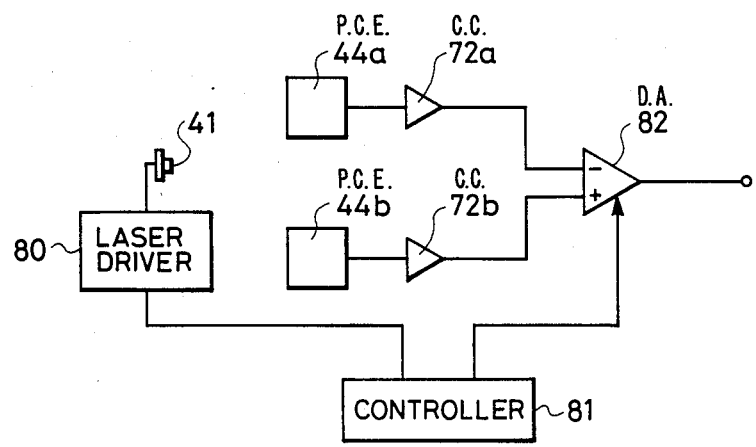

FIG. 20 shows a modification of the circuit shown in FIG. 19. The amplification rate of a differential amplifier 82 which outputs the difference between the outputs of the circuits 72a and 72b is changed over as soon as instructions are given from the controller 81 to the laser driver 80 with the recording, reproduction and erasing so as to change over the output of the laser 41.

Also, in the embodiments of FIGS. 19 and 20, the amplification rate may be changed with the fluctuation of the output of the laser 41 by extraneous factors (temperature, time of use, etc.) taken into account.

The present invention is not restricted to the above-described embodiments, but various modifications thereof are possible. For example, in the embodiments illustrated, the photoelectric converting elements 44a and 44b are provided in the marginal portion of the objective between the half-mirror and the objective, but they may be provided at any location moved in the tracking direction with the objective and lying on at least a part of the light beam. Also, if the photoelectric converting elements are designed such that the outputs thereof are compared with a discretely provided reference voltage, a single such element may be required. Of course, three or more photoelectric converting elements may also be provided.

Further, the embodiments have been shown with respect to a case where use is made of the push-pull method using a two-division photosensor, but it is apparrent that in both the heterodyne method using a four-division photosensor and the method using a more-division photosensor, tracking control can be carried out in a similar way by contriving the number of light-receiving elements and the location at which they are installed.

What is claimed is:

1. An optical information processing apparatus comprising:
    a light source for providing a light beam;
    a lens system for condensing the light beam from said light source as a minute spot on a track of a recording medium;
    tracking signal detecting means for receiving the light beam from said spot modulated by said recording medium to thereby detect a positional deviation of said spot relative to the track in a tracking direction crossing the track and for providing an output signal corresponding to the positional deviation;
    correcting means for moving said lens system in the tracking direction in response to at least the output signal from said tracking signal detecting means to thereby correct the positional deviation; and
    lens position detecting means including at least one photoelectric converting element, provided outside the effective diameter of said lens system so as to be movable with said lens system, for directly receiving part of the light beam from said light source to thereby detect the position of said lens system in the tracking direction.

2. An optical information processing apparatus according to claim 1, wherein the output signal of said lens position detecting means is added to the output of said tracking signal detecting means and input to said correcting means.

3. An optical information processing apparatus according to claim 1, further comprising a stop provided in the optical path between said light source and said photoelectric converting element.

4. An optical information processing apparatus according to claim 1, wherein said lens position detecting means has two photoelectric converting elements provided symmetrically in the tracking direction with respect to the optic axis of said lens system, and a subtracter for differentiating the outputs of said photoelectric converting elements to each other.

5. An optical information processing apparatus according to claim 4, further comprising an adder for summing the outputs of said two photoelectric converting elements, and a divider for diving the output of said subtracter by the output of said adder.

6. An optical information processing apparatus according to claim 1, further comprising light output detecting means for detecting the light output of said light source, and a divider for dividing the output of said lens position detecting means by the output of said light output detecting means.

7. An optical information processing apparatus according to claim 6, wherein said light source comprises a semiconductor laser, and said light output detecting means comprises a photodetector for receiving a light beam emitted from the surface of said semiconductor laser which is opposite to the surface of said semiconductor laser which emits a light beam toward said medium.

8. An optical information processing apparatus according to claim 1, further comprising an amplifier for amplifying the output signal of said lens position detecting means, and a controller for varying the light output of said light source and at the same time varying the amplification rate of said amplifier.

9. An optical information processing apparatus according to claim 1, wherein said tracking signal detecting means comprises a photodetector having its light-receiving surface divided in a direction corresponding to the tracking direction, and a subtracter for differentiating the output signal of each of said divided light-receiving surfaces.

* * * * *

UNITED STATES PATENT AND TRADEMARK OFFICE
CERTIFICATE OF CORRECTION

PATENT NO. : 4,853,917

DATED : August 1, 1989

INVENTOR(S) : Osamu Koyama, et al.

It is certified that error appears in the above-identified patent and that said Letters Patent is hereby corrected as shown below:

COLUMN [54]

The Title should read --OPTICAL TRACKING APPARATUS WITH PHOTODETECTOR DISPOSED OUTSIDE PART OF THE EFFECTIVE DIAMETER OF THE LENS SYSTEM--.

COLUMN [56]

"Fitzpatrick, Cella Harper & Scinto" should read --Fitzpatrick, Cella, Harper & Scinto--.

COLUMN 1

Line 40 "FIGS. 1A,1B,2A and 2B" should read --FIGS. 1A, 1B, 2A and 2B--.

COLUMN 2

Line 28, "f2=40" should read --$f_2$=40--.
Line 33, "as" should read --an--.
Line 59, "into," should read --zero,--.

UNITED STATES PATENT AND TRADEMARK OFFICE
CERTIFICATE OF CORRECTION

PATENT NO. 4,853,917

Page 2 of 3

DATED  August 1, 1989

INVENTOR(S) Osamu Koyama, et al.

It is certified that error appears in the above-identified patent and that said Letters Patent is hereby corrected as shown below:

COLUMN 3

Line 43, "ratus," should read --ratus--.

COLUMN 4

Line 20, "FIGS. 1A,1B,2A and 2B" should read --FIGS. 1A, 1B, 2A and 2B--.

COLUMN 6

Line 10, "different outputs" should read --differential outputs--.
   Line 58, "by" should read --be--.
   Line 59, "ot" should read --to--.

COLUMN 7

Line 10, "become" should read --becomes--.

UNITED STATES PATENT AND TRADEMARK OFFICE
CERTIFICATE OF CORRECTION

PATENT NO. : 4,853,917

DATED : August 1, 1989

INVENTOR(S) : Osamu Koyama, et al.

It is certified that error appears in the above-identified patent and that said Letters Patent is hereby corrected as shown below:

COLUMN 9

Line 4, "½.5 times." should read --1/2.5 times.--.
    Line 33, "parrent" should read --parent--.
    Line 37, "location" should read --locations--.

COLUMN 10

Line 23, "to" should read --from--.

Signed and Sealed this

Fourteenth Day of August, 1990

Attest:

HARRY F. MANBECK, JR.

*Attesting Officer*    *Commissioner of Patents and Trademarks*